(12) United States Patent
Montagnese

(10) Patent No.: US 7,173,636 B2
(45) Date of Patent: Feb. 6, 2007

(54) METHOD AND SYSTEM FOR GENERATING DETAIL-IN-CONTEXT LENS PRESENTATIONS FOR ELEVATION DATA

(75) Inventor: Catherine Montagnese, Vancouver (CA)

(73) Assignee: Idelix Software Inc., Vancouver (CA)

( * ) Notice: Subject to any disclaimer, the term of this patent is extended or adjusted under 35 U.S.C. 154(b) by 132 days.

(21) Appl. No.: 11/083,037

(22) Filed: Mar. 18, 2005

(65) Prior Publication Data

US 2005/0206655 A1 Sep. 22, 2005

Related U.S. Application Data

(60) Provisional application No. 60/553,985, filed on Mar. 18, 2004.

(51) Int. Cl.
*G09G 5/00* (2006.01)
(52) U.S. Cl. ............... 345/660; 345/664; 345/671; 345/619
(58) Field of Classification Search ............... 345/619, 345/660, 664, 671, 647
See application file for complete search history.

(56) References Cited

U.S. PATENT DOCUMENTS 7,106,349 B2 * 9/2006 Baar et al. ................. 345/647
2002/0075280 A1 * 6/2002 Tigges ....................... 345/619
2003/0006995 A1 * 1/2003 Smith et al. ................ 345/671
2003/0137525 A1 * 7/2003 Smith ........................ 345/671
2004/0217979 A1 * 11/2004 Baar et al. .................. 345/660
2005/0134610 A1 * 6/2005 Doyle et al. ................ 345/647

OTHER PUBLICATIONS

Carpendale, Marianne S.T., "A Framework for Elastic Presentation Space"(Burnaby, British Columbia: Simon Fraser University, 1999).

* cited by examiner

*Primary Examiner*—Kee M. Tung
*Assistant Examiner*—Chante Harrison
(74) *Attorney, Agent, or Firm*—Joseph Conneely; McCarthy Tetrault LLP

(57) ABSTRACT

A method for generating a presentation of a region-of-interest in an elevation data representation for display on a display screen, comprising: calculating a displacement height for at least one point in the representation falling within a lens by inversely scaling a vertical height of the point from a viewpoint for the presentation by a magnification for the lens; if the point is within a shoulder region of the lens, scaling the displacement height by a value of the shoulder function evaluated at a value given by a distance between a projection point in the basal plane and a closest point on a perimeter of a focal region as projected onto the basal plane, the distance being scaled by a distance between the closest point and an intersection point on a perimeter of the shoulder region; and, displacing the point by the displacement height to generate the presentation.

21 Claims, 6 Drawing Sheets

METHOD AND SYSTEM FOR GENERATING DETAIL-IN-CONTEXT LENS PRESENTATIONS FOR ELEVATION DATA

This application claims priority from U.S. Provisional Patent Application No. 60/553,985, filed Mar. 18, 2004, and incorporated herein by reference.

FIELD OF THE INVENTION

The invention relates to the field of computer graphics processing, and more specifically, to a method and system for generating detail-in-context lens presentations for terrain or elevation data.

BACKGROUND OF THE INVENTION

Display screens are the primary visual display interface for computers. One problem with display screens is that they are limited in size, thus presenting a challenge to user interface design, particularly when large amounts of visual information are to be displayed. This problem is often referred to as the "screen real estate problem". Known tools for addressing this problem include panning and zooming. While these tools are suitable for a large number of display applications, they become less effective when sections of the visual information are spatially related, for example in layered maps and three-dimensional representations. In this type of visual information display, panning and zooming are not as effective as much of the context of the visual information may be hidden in the panned or zoomed display.

A more recent solution to the screen real estate problem involves the application of "detail-in-context" presentation techniques. Detail-in-context is the magnification of a particular region-of-interest (the "focal region" or "detail") in a presentation while preserving visibility of the surrounding information (the "context"). This technique has applicability to the display of large surface area media (e.g., digital maps) on display screens of variable size including those of graphics workstations, laptop computers, personal digital assistants ("PDAs"), and cellular telephones.

In general, a detail-in-context presentation may be considered as a distorted view (or distortion) of a region-of-interest in an original image or representation where the distortion is the result of the application of a "lens" like distortion function to the original image. The lens distortion is typically characterized by magnification of a region-of-interest (the "focal region") in an image where detail is desired in combination with compression of a region of the remaining information surrounding the region-of-interest (the "shoulder region"). The area of the image affected by the lens includes the focal region and the shoulder region. These regions define the perimeter of the lens. The shoulder region and the area surrounding the lens provide "context" for the "detail" in the focal region of the lens. The resulting detail-in-context presentation resembles the application of a lens to the image. A detailed review of various detail-in-context presentation techniques such as "Elastic Presentation Space" ("EPS") may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), which is incorporated herein by reference.

Note that in the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed on a display screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

One shortcoming of exiting detail-in-context presentation methods is their inability to effectively distort terrain or other elevation data including digital elevations model ("DEM") data. In general, a DEM is a representation of cartographic information in a raster, vector, or other data format. Typically, a DEM consists of a sampled array of elevations for a number of ground positions at regularly spaced intervals. The intervals may be, for example, 7.5-minute, 15-minute, 2-arc-second (also known as 30-minute), and 1-degree units. The 7.5- and 15-minute DEMs may be categorized as large-scale, 2-arc-second DEMs may be categorized as intermediate-scale, and 1-degree DEMs may be categorized as small-scale. Often, for example, the distortion of DEM data using existing detail-in-context methods will result in a detail-in-context presentation in which the viewer appears to be "underneath" the data.

A need therefore exists for an effective method and system for generating detail-in-context presentations for elevation or terrain data. Accordingly, a solution that addresses, at least in part, the above and other shortcomings is desired.

SUMMARY OF THE INVENTION

According to one aspect of the invention, there is provided a method for generating a presentation of a region-of-interest in an elevation data representation for display on a display screen, comprising: calculating a displacement height for at least one point in the representation falling within a lens, the lens being defined over a basal plane and having a focal region for the region-of-interest at least partially surrounded by a shoulder region defined by a shoulder function, by inversely scaling a vertical height of the point from a viewpoint for the presentation by a magnification for the lens; if the point is within the shoulder region of the lens, scaling the displacement height by a value of the shoulder function evaluated at a value given by a distance between a projection point in the basal plane of a line drawn through the viewpoint and the point and a closest point on a perimeter of the focal region as projected onto the basal plane, the distance being scaled by a distance between the closest point and an intersection point on a perimeter of the shoulder region in the basal plane of a line drawn through the closest point and the projection point; and, displacing the point by the displacement height to generate the presentation.

Preferably, the method further includes projecting the presentation onto a plane in a uniform direction aligned with the viewpoint. Preferably, the method further includes displaying the presentation on the display screen. Preferably, the method further includes determining whether the point is within the lens by comparing the projection point to the perimeter of the shoulder region. Preferably, the lens is defined by a distortion function. Preferably, the elevation data representation is a digital elevations model ("DEM") data representation. Preferably, the method further includes: displaying the presentation in a first window on the display screen; and, generating for display in a second window on the display screen a second presentation of the region-of-interest, the region-of-interest for the second presentation being in a second data representation at least partially coextensive with the elevation data representation.

In accordance with further aspects of the present invention there are provided apparatus such as a data processing system, methods for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

As mentioned above, a detail-in-context presentation may be considered as a distorted view (or distortion) of a portion of the original representation or image where the distortion is the result of the application of a "lens" like distortion function to the original representation. In general, detail-in-context data presentations are characterized by magnification of areas of an image where detail is desired, in combination with compression of a restricted range of areas of the remaining information, the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

Figure 1:
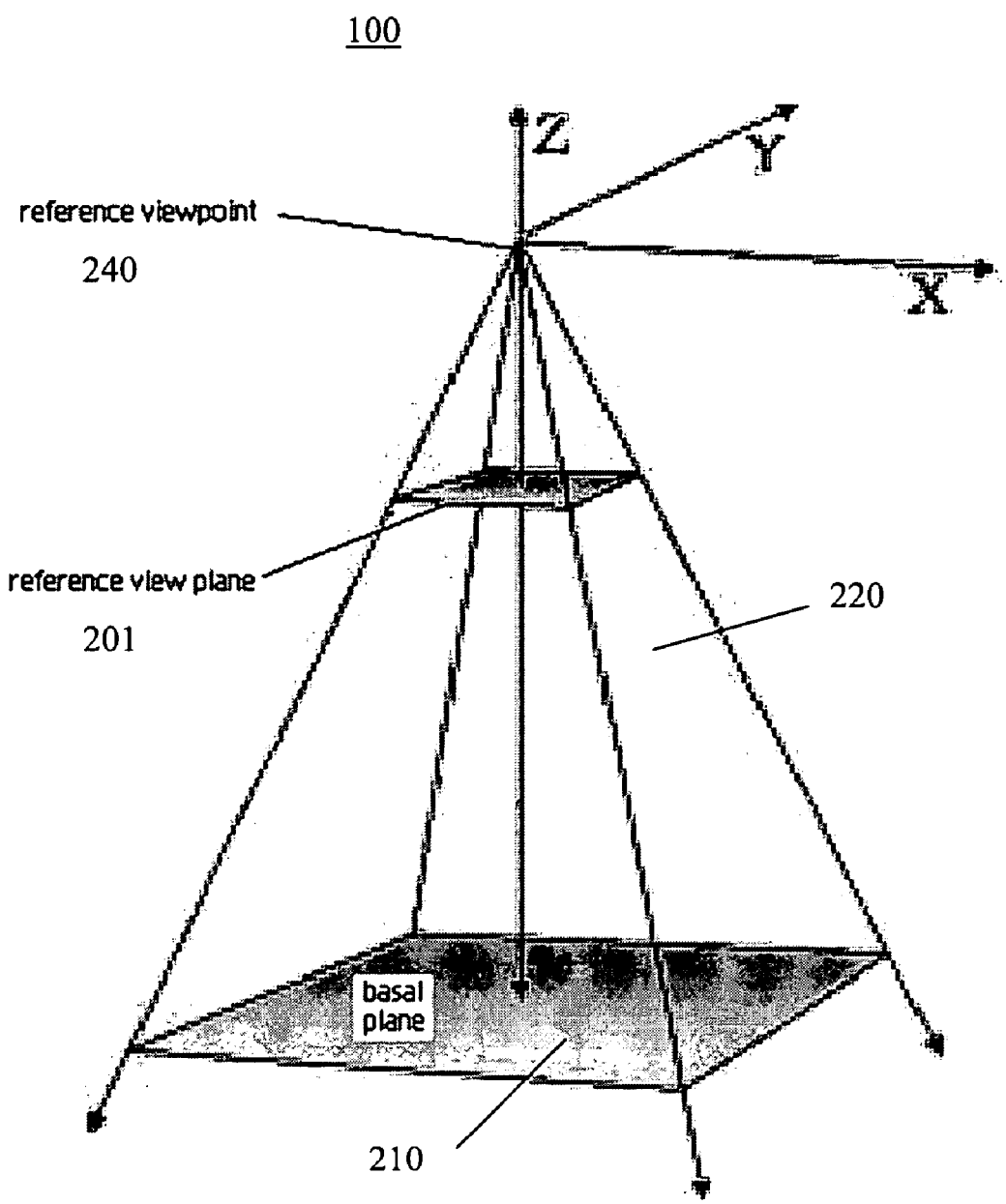
FIG. 1 is a graphical representation of the geometry for constructing a three-dimensional perspective viewing frustum, relative to an x, y, z coordinate system, in accordance with known elastic presentation space graphics technology.

FIG. 1 is a graphical representation of the geometry 100 for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape containing the frustum 220. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
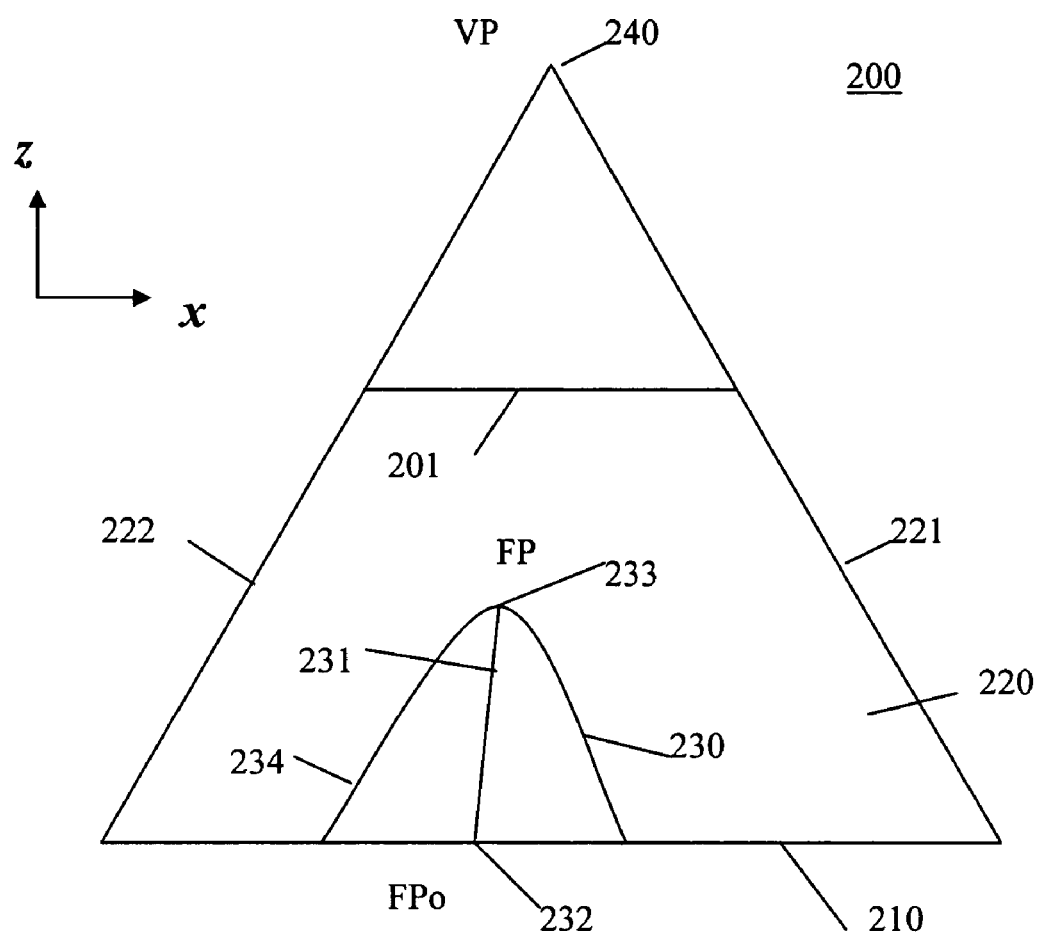
FIG. 2 is a graphical representation of the geometry of a presentation in accordance with known elastic presentation space graphics technology.

FIG. 2 is a graphical representation of the geometry 200 of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e., a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a uniform direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e., the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region 233 and the shoulder 234. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 210, 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
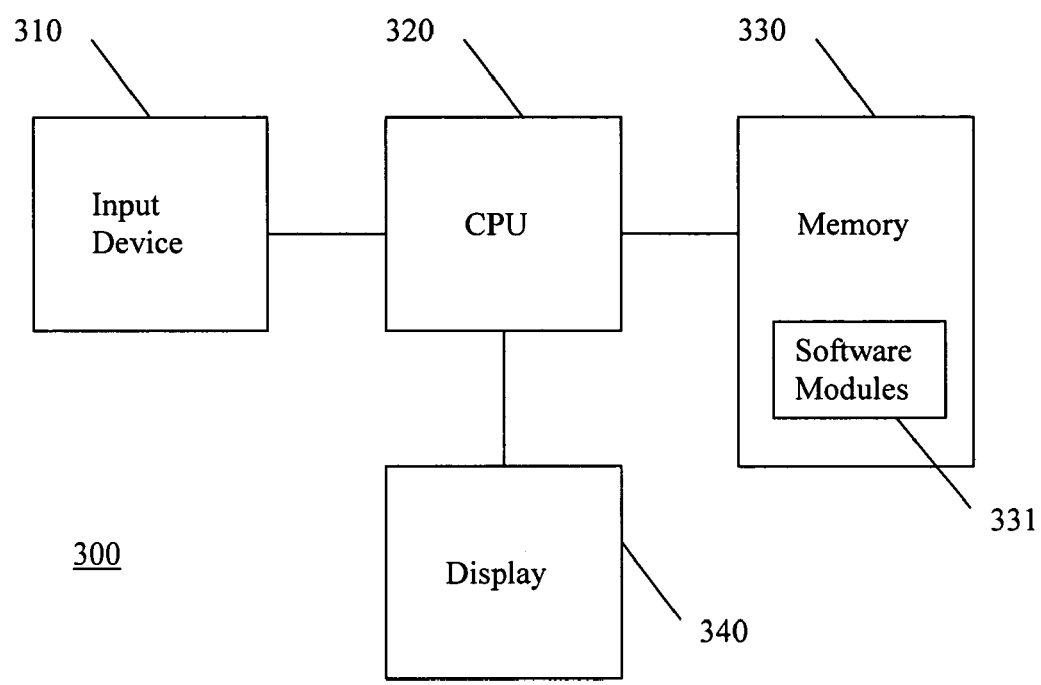
FIG. 3 is a block diagram illustrating a data processing system adapted for implementing an embodiment of the invention.

FIG. 3 is a block diagram of a data processing system 300 adapted to implement an embodiment of the invention. The data processing system 300 is suitable for implementing EPS technology and for generating detail-in-context presentations of elevation data representations. The data processing system 300 includes an input device 310, a central processing unit ("CPU") 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal-bearing medium that is uploaded to a network by a vendor or supplier of the programmed instructions, and this signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on display surfaces of variable size. Detail-in-context views allow magnification of a particular region-of-interest (the "focal region") 233 in a data presentation while preserving visibility of the surrounding information 210.

Now, in known detail-in-context displacement algorithms, it is generally assumed that a point has a position at (x, y) and is located on a basal plane at z=0. According to one embodiment of the invention, detail-in-context lenses for terrain, DEM, or other elevation data are generated using a modified displacement algorithm in order to provide effective detail-in-context viewing of that data. In particular, since elevation data has a z value that is usually not equal to zero, this extra dimension must be taken into consideration when displacing a point to generate an effective detail-in-context lens presentation. If the z value is not taken into consideration, then, as the magnification of a lens increases, the displacement of points would eventually exceed the view reference point and the viewer would appear to be "underneath" the data.

Figure 4:
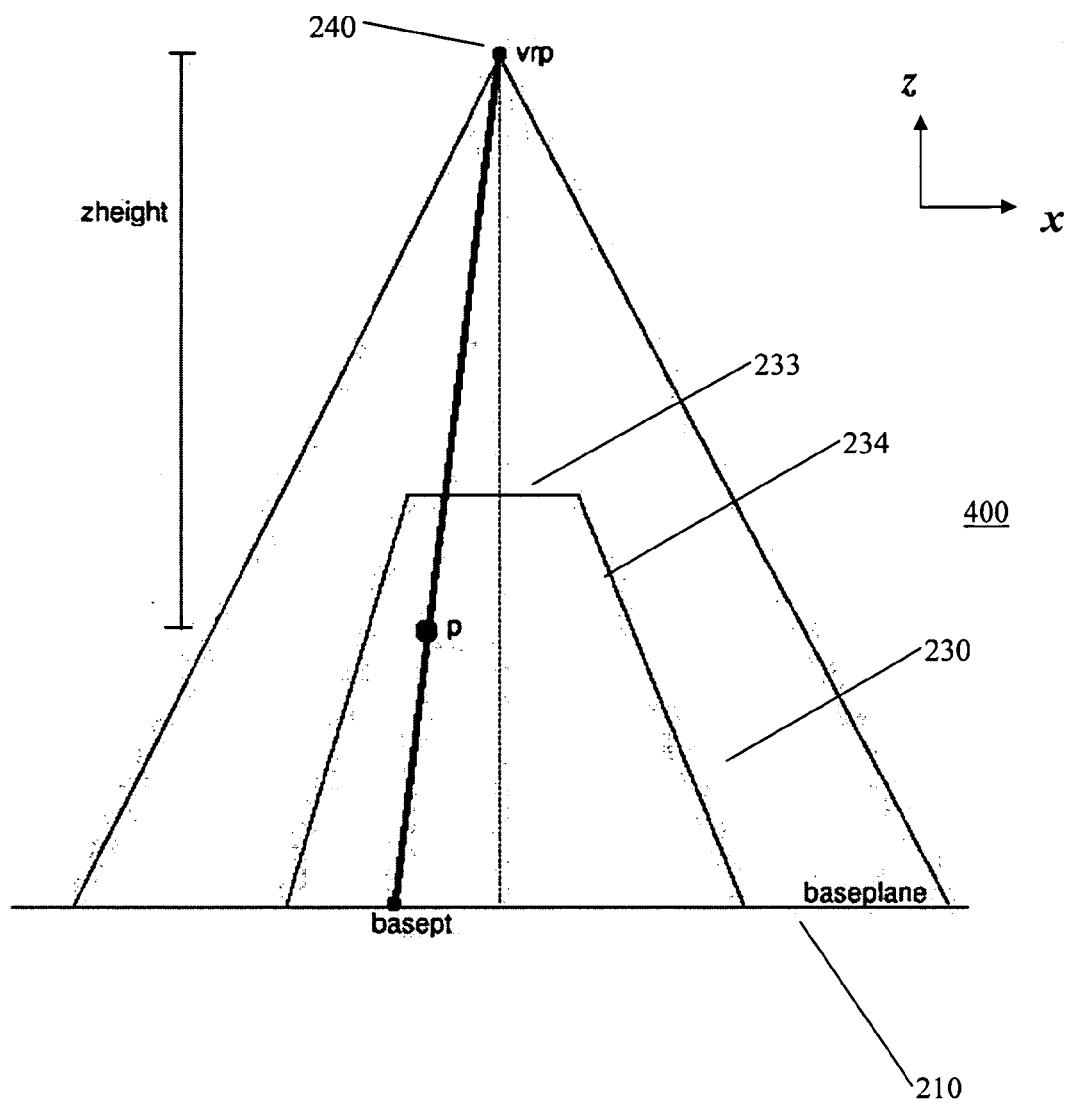
FIG. 4 is a graphical representation of the geometry for generating a detail-in-context presentation of elevation data in accordance with an embodiment of the invention.
Figure 5:
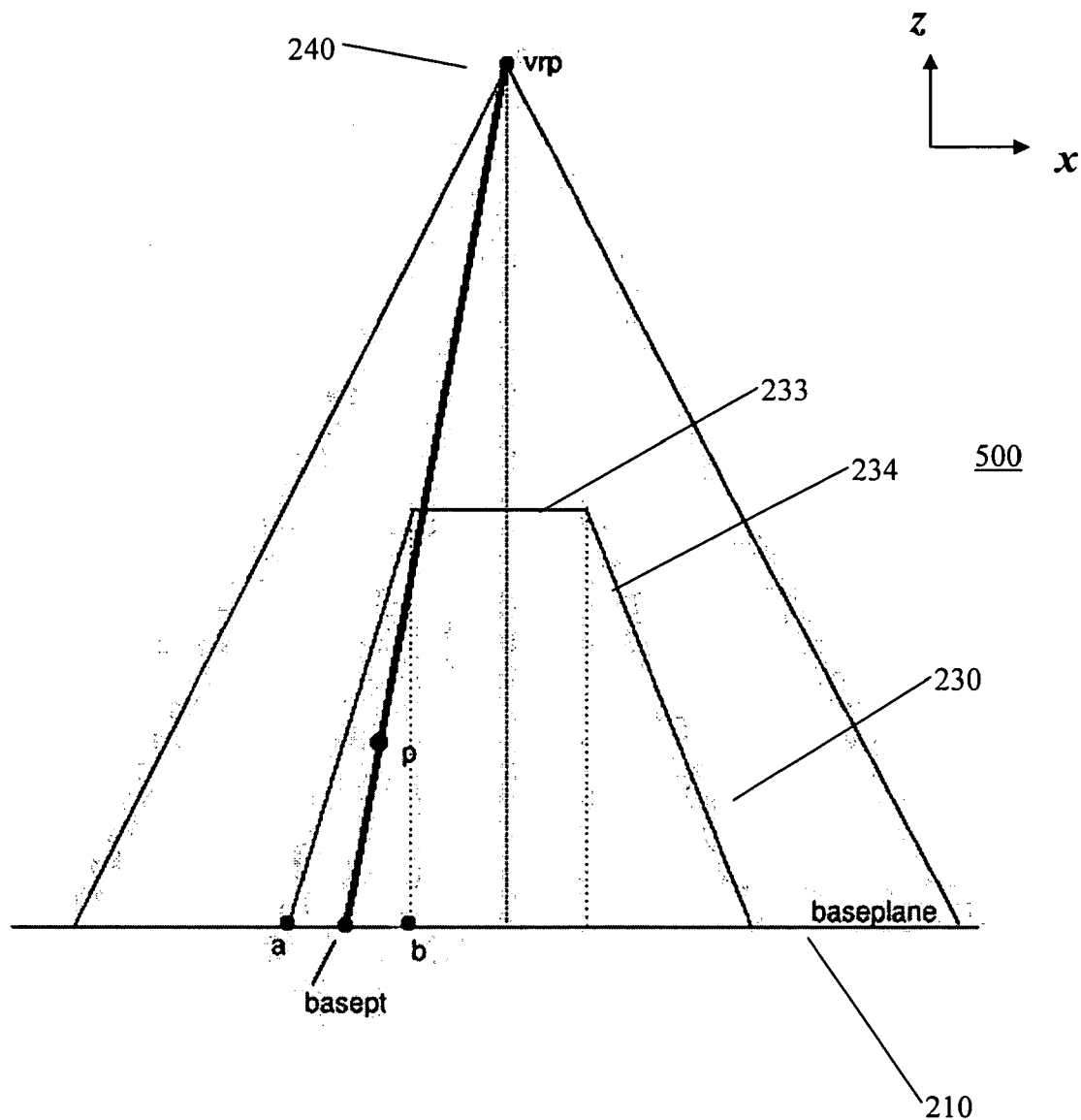
FIG. 5 is a graphical representation of the geometry of the shoulder region of the lens represented in FIG. 4 in accordance with an embodiment of the invention; and, FIG. 6 is a flow chart illustrating operations of software modules within the memory of the data processing system for generating a presentation of a region-of-interest in an elevation data representation for display on a display screen in accordance with an embodiment of the invention.

FIG. 4 is a graphical representation of the geometry 400 for generating a detail-in-context presentation for elevation data in accordance with an embodiment of the invention. And, FIG. 5 is a graphical representation of the geometry 500 of the shoulder region of the lens represented in FIG. 4 in accordance with an embodiment of the invention. In FIGS. 4 and 5, the lens 230 has a truncated pyramid shape having a flat focal region 233 and a declining shoulder region 234. However, of course, the lens 230 may have any predetermined or user defined shape. The following definitions pertain to FIGS. 4 and 5 and the following method description:

vrp is the position of the viewer or view reference point (see 240 in FIG. 1);

baseplane is the basal plane located at z=0 (see 210 in FIG. 1);

p is the original elevation point to be displaced;

basept is the projection of point p onto the baseplane along a vector "v", where v=vrp−p;

zheight is the z distance from the vrp to the point p;

"magnification" is the magnification factor of the lens 230. For example, if the magnification factor of a lens 230 is "N", then the distance between two points that fall within the focal region 233 of the lens 230 will be increased by a factor of N compared to the case where no lens 230 is present;

b is the closest point to basept of a projection of the perimeter of the focal region 233;

a is the point on the perimeter of the shoulder region 234 on the line defined by (basept−b); and, "s" is the scalar distance given by distance (basept−b) / distance (a−b), where "distance" is the Euclidean distance between the two argument points.

According to one embodiment, a method of displacing points in the original elevation data (i.e., applying a distortion) to generate a detail-in-context presentation includes the following steps:

1. Project point p onto the baseplane along vector v=vrp−p to determine if the projected point basept falls within the lens bounds (i.e., within the lensed area which includes the focal region 233 and the shoulder region 234 of the lens 230). If the projected point basept falls within the lens bounds, then the point p will be displaced.

2. If basept falls within the lens bounds, then calculate the displacement height (i.e., "displacement_height") of the point p using the vrp and the z value zheight of p as follows:

displacement_height=zheight−(zheight/magnification)

3. Take into account the shoulder 234 of the lens 230 as follows. If the basept falls within the shoulder 234 of the lens 230, then scale the displacement height by a value that is calculated using the shoulder function of the lens 230 (e.g., "ShoulderFunction( )" which defines the distortion function for the shoulder region 234 of the lens 230). Each lens has a shoulder function that typically has a domain and range of [0,1]. The shoulder function operates on a scalar value s that is the relative placement of the basept within the shoulder region 234 of the lens 230. The displacement height of a point that falls within the shoulder region 234 of the lens 230 is determined as follows:

displacement_height=displacement_height*ShoulderFunction(s)

4. Displace p by this displacement height along the z-normalized viewing vector towards the vrp. The vrp can be moved to different positions in order to view the terrain data from different orientations.

Advantageously, by using the above method to generate a detail-in-context presentation for a DEM, the problem of a viewer appearing to be "underneath" the data is alleviated.

Figure 6:
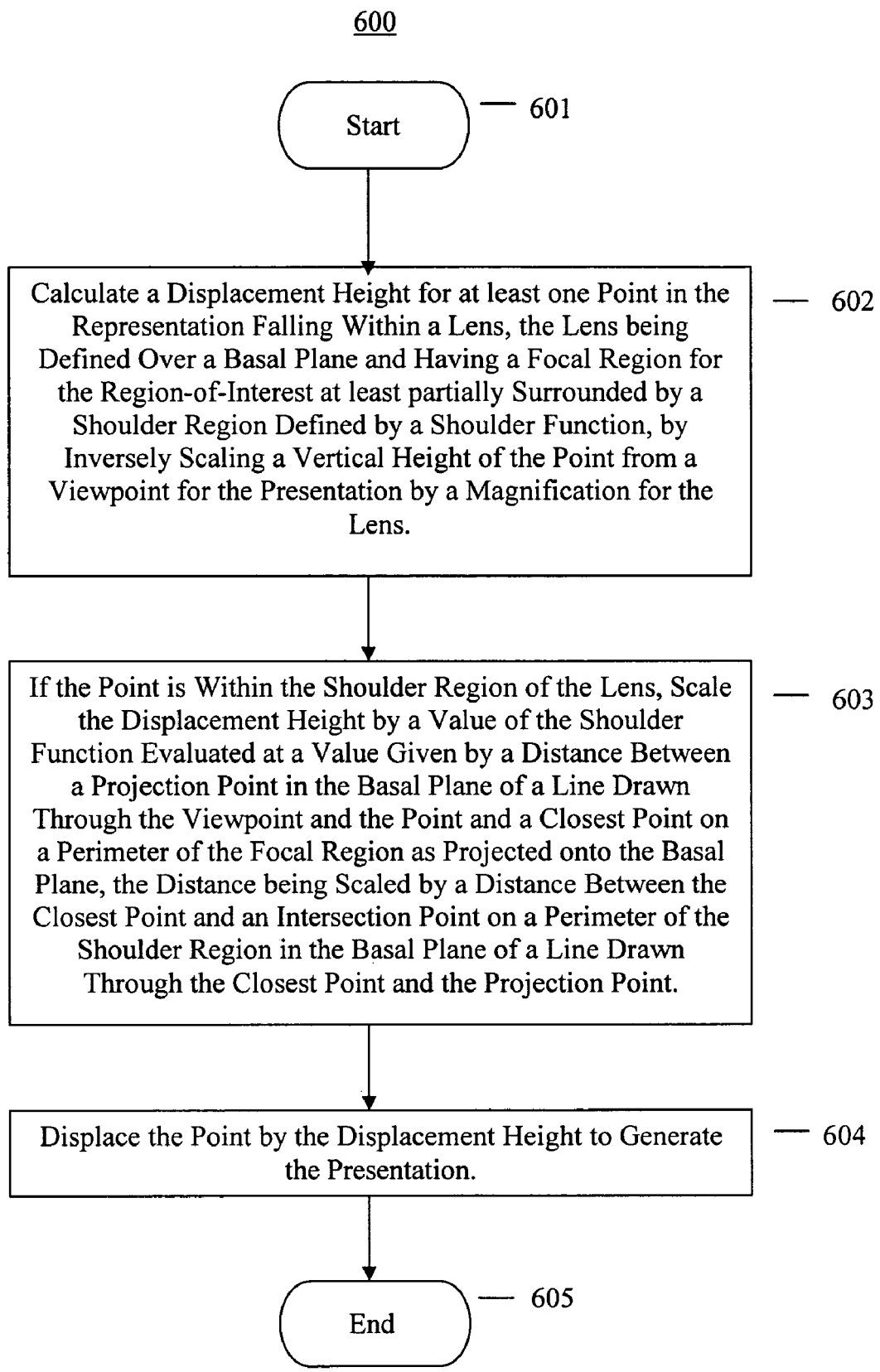

The above described method may be summarized with the aid of a flowchart. FIG. 6 is a flow chart illustrating operations 600 of software modules 331 within the memory 330 of the data processing system 300 for generating a presentation of a region-of-interest in an elevation data representation for display on a display screen 340 in accordance with an embodiment of the invention.

At step 601, the operations 600 start.

At step 602, a displacement height (i.e., "displacement_height") is calculated for at least one point p in the representation falling within a lens 230, the lens 230 being defined over a basal plane 210 and having a focal region 233 for the region-of-interest at least partially surrounded by a shoulder region 234 defined by a shoulder function (i.e., "ShoulderFunction( )"), by inversely scaling a vertical height zheight of the point p from a viewpoint vrp 240 for the presentation by a magnification N for the lens.

At step 603, if the point p is within the shoulder region 234 of the lens 230, the displacement height is scaled by a value of the shoulder function evaluated at a value given by a distance between a projection point in the basal plane of a line drawn through the viewpoint and the point and a closest point on a perimeter of the focal region as projected onto the basal plane, the distance being scaled by a distance between the closest point and an intersection point on a perimeter of the shoulder region in the basal plane of a line drawn through the closest point and the projection point (i.e., ShoulderFunction (s), where s=distance(basept−b)/distance (a−b)).

At step 604, the point p is displaced by the displacement height to generate the presentation.

At step 605, the operations 600 end.

Preferably, the method further includes projecting the presentation onto a plane 201 in a uniform direction (i.e., FPo-FP 231 in FIG. 2) aligned with the viewpoint 240. Preferably, the method further includes displaying the presentation on the display screen 340. Preferably, the method further includes determining whether the point p is within the lens 230 by comparing the projection point basept to the perimeter of the shoulder region 234. Preferably, the lens 230 is defined by a distortion function. Preferably, the elevation data representation is a digital elevations model ("DEM") data representation. Preferably, the method further includes: displaying the presentation in a first window on the display screen 340; and, generating for display in a second window on the display screen 340 a second presentation of the region-of-interest, the region-of-interest for the second presentation being in a second data representation at least partially coextensive with the elevation data representation.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the exemplary data processing system 300 of FIG. 3 can be contained in a data carrier product according to one embodiment of the invention. This data carrier product can be loaded into and run by the exemplary data processing system 300 of FIG. 3. In addition, the sequences of instructions which when executed cause the method described herein to be performed by the exemplary data processing system 300 of FIG. 3 can be contained in a computer software product according to one embodiment of the invention. This computer software product can be loaded into and run by the exemplary data processing system 300 of FIG. 3. Moreover, the sequences of instructions which when executed cause the method described herein to be performed by the exemplary data processing system 300 of FIG. 3 can be contained in an integrated circuit product including a coprocessor or memory according to one embodiment of the invention. This integrated circuit product can be installed in the exemplary data processing system 300 of FIG. 3.

The embodiments of the invention described above are intended to be exemplary only. The scope of the invention is therefore intended to be limited solely by the scope of the appended claims.

What is claimed is:

1. A method for generating a presentation of a region-of-interest in an elevation data representation for display on a display screen, comprising:
calculating a displacement height for at least one point in the representation falling within a lens, the lens being defined over a basal plane and having a focal region for the region-of-interest at least partially surrounded by a shoulder region defined by a shoulder function, by inversely scaling a vertical height of the point from a viewpoint for the presentation by a magnification for the lens;
if the point is within the shoulder region of the lens, scaling the displacement height by a value of the shoulder function evaluated at a value given by a distance between a projection point in the basal plane of a line drawn through the viewpoint and the point and a closest point on a perimeter of the focal region as projected onto the basal plane, the distance being scaled by a distance between the closest point and an intersection point on a perimeter of the shoulder region in the basal plane of a line drawn through the closest point and the projection point; and,
displacing the point by the displacement height to generate the presentation.

2. The method of claim 1 and further comprising projecting the presentation onto a plane in a uniform direction aligned with the viewpoint.

3. The method of claim 2 and further comprising displaying the presentation on the display screen.

4. The method of claim 3 and further comprising: displaying the presentation in a first window on the display screen; and, generating for display in a second window on the display screen a second presentation of the region-of-interest, the region-of-interest for the second presentation being in a second data representation at least partially coextensive with the elevation data representation.

5. The method of claim 1 and further comprising determining whether the point is within the lens by comparing the projection point to the perimeter of the shoulder region.

6. The method of claim 1 wherein the lens is defined by a distortion function.

7. The method of claim 1 wherein the elevation data representation is a digital elevations model ("DEM") data representation.

8. A system for generating a presentation of a region-of-interest in an elevation data representation for display on a display screen, comprising:
a processor coupled to memory and the display screen and adapted for:
calculating a displacement height for at least one point in the representation falling within a lens, the lens being defined over a basal plane and having a focal region for the region-of-interest at least partially surrounded by a shoulder region defined by a shoulder function, by inversely scaling a vertical height of the point from a viewpoint for the presentation by a magnification for the lens;
if the point is within the shoulder region of the lens, scaling the displacement height by a value of the shoulder function evaluated at a value given by a distance between a projection point in the basal plane of a line drawn through the viewpoint and the point and a closest point on a perimeter of the focal region as projected onto the basal plane, the distance being scaled by a distance between the closest point and an intersection point on a perimeter of the shoulder region in the basal plane of a line drawn through the closest point and the projection point; and,
displacing the point by the displacement height to generate the presentation.

9. The system of claim 8 wherein the processor is further adapted for projecting the presentation onto a plane in a uniform direction aligned with the viewpoint.

10. The system of claim 9 wherein the processor is further adapted for displaying the presentation on the display screen.

11. The system of claim 10 wherein the processor is further adapted for: displaying the presentation in a first window on the display screen; and, generating for display in a second window on the display screen a second presentation of the region-of-interest, the region-of-interest for the second presentation being in a second data representation at least partially coextensive with the elevation data representation.

12. The system of claim 8 wherein the processor is further adapted for determining whether the point is within the lens by comparing the projection point to the perimeter of the shoulder region.

13. The system of claim 8 wherein the lens is defined by a distortion function.

14. The system of claim 8 wherein the elevation data representation is a digital elevations model ("DEM") data representation.

15. A computer program product having a computer readable medium encoded with a program having computer executable code for directing a data processing system to generate a presentation of a region-of-interest in an elevation data representation for display on a display screen, comprising:
code for calculating a displacement height for at least one point in the representation falling within a lens, the lens being defined over a basal plane and having a focal region for the region-of-interest at least partially surrounded by a shoulder region defined by a shoulder function, by inversely scaling a vertical height of the point from a viewpoint for the presentation by a magnification for the lens;
code for, if the point is within the shoulder region of the lens, scaling the displacement height by a value of the shoulder function evaluated at a value given by a distance between a projection point in the basal plane of a line drawn through the viewpoint and the point and a closest point on a perimeter of the focal region as projected onto the basal plane, the distance being scaled by a distance between the closest point and an intersection point on a perimeter of the shoulder region in the basal plane of a line drawn through the closest point and the projection point; and,
code for displacing the point by the displacement height to generate the presentation.

16. The computer program product of claim 15 and further comprising code for projecting the presentation onto a plane in a uniform direction aligned with the viewpoint.

17. The computer program product of claim 16 and further comprising code for displaying the presentation on the display screen.

18. The computer program product of claim 17 and further comprising: code for displaying the presentation in a first window on the display screen; and, code for generating for display in a second window on the display screen a second presentation of the region-of-interest, the region-of-interest for the second presentation being in a second data representation at least partially coextensive with the elevation data representation.

19. The computer program product of claim 15 and further comprising code for determining whether the point is within the lens by comparing the projection point to the perimeter of the shoulder region.

20. The computer program product of claim 15 wherein the lens is defined by a distortion function.

21. The computer program product of claim 15 wherein the elevation data representation is a digital elevations model ("DEM") data representation.

* * * * *